(12) United States Patent
Webster

(10) Patent No.: US 6,914,345 B2
(45) Date of Patent: Jul. 5, 2005

(54) POWER GENERATION

(75) Inventor: John R Webster, Derby (GB)

(73) Assignee: Rolls-Royce plc, London (GB)

( * ) Notice: Subject to any disclaimer, the term of this patent is extended or adjusted under 35 U.S.C. 154(b) by 158 days.

(21) Appl. No.: 10/600,564

(22) Filed: Jun. 23, 2003

(65) Prior Publication Data

US 2004/0069899 A1 Apr. 15, 2004

(30) Foreign Application Priority Data

Jul. 16, 2002 (GB) .............................................. 0216482

(51) Int. Cl.⁷ ............................. H02P 9/04; H02K 35/00
(52) U.S. Cl. ....................... 290/54; 290/43; 244/153 R; 415/2
(58) Field of Search ............................. 290/42, 43, 53, 290/54; 244/153 R; 415/2, 7, 24

(56) References Cited

U.S. PATENT DOCUMENTS

| | | | | |
|---|---|---|---|---|
| 3,987,987 A | * | 10/1976 | Payne et al. ............ | 244/153 R |
| 4,165,468 A | * | 8/1979 | Fry et al. ....................... | 290/55 |
| 4,166,596 A | * | 9/1979 | Mouton et al. ............... | 244/30 |
| 4,491,739 A | * | 1/1985 | Watson ......................... | 290/44 |
| 4,572,962 A | * | 2/1986 | Shepard ........................ | 290/55 |
| 6,091,161 A | * | 7/2000 | Dehlsen et al. ............... | 290/43 |
| 6,254,034 B1 | | 7/2001 | Carpenter ............... | 244/153 R |
| 6,523,781 B2 | * | 2/2003 | Ragner ................... | 244/153 R |
| 6,555,931 B2 | * | 4/2003 | Mizzi ........................... | 290/54 |
| 6,756,695 B2 | * | 6/2004 | Hibbs et al. .................. | 290/42 |

FOREIGN PATENT DOCUMENTS

| | | |
|---|---|---|
| DE | 3 232 186 | 3/1984 |
| EP | 0 841 480 | 5/1998 |
| RU | 2 020 264 | 9/1994 |

OTHER PUBLICATIONS

Gary Dean Wagner, Axial–Mode Linear Wind–Trubine, Patent Application Publication, Apr. 11, 2002.

* cited by examiner

*Primary Examiner*—Nicholas Ponomarenko
(74) *Attorney, Agent, or Firm*—W. Warren Taltavull; Manelli Denison & Selter PLLC

(57) ABSTRACT

A power generator comprising: a lifting body for suspension in a moving fluid; a control station; and at least two tethers for tethering the lifting body to the control station. The control station is arranged to transform oscillating tension in the tethers produced by an oscillating movement of the lifting body into mechanical motion.

19 Claims, 4 Drawing Sheets

Flywheel

Angle α
Displacement of

Angle α of
Lifting Object

Flywheel

Angle α
Displacement of

Angle α of
Lifting Object

Flywheel

Angle α
Displacement
of

Angle α of
Lifting Object

Flywheel

Angle α
Displacement
of

Angle α of
Lifting Object

POWER GENERATION

The present invention relates to power generation using a lifting body in a fluid flow.

Power is generally obtained from wind using windmills which are large relatively expensive structures. Power is obtained from water using hydro-electric dams. It would be desirable to have alternative, less expensive mechanisms for obtaining power from fluid flow.

U.S. Pat. No. 6,254,034 describes a system for electricity generation in which wind blows a tethered tractor kite downwind. The kite has a single tether wound around a windlass drum, which is connected to an electrical generator and a motor. The cycle for generation of electrical power involves a downwind travelling phase and an upwind travelling phase. In the downwind phase, the downwind travelling kite generates power. It pulls its tether off the windlass drum and drives the electrical generator. In the upwind travelling phase the kite is controlled to change its shape or pitch by special mechanisms in the kite itself and the motor revolves the drum to reel in the tether. This system has several drawbacks. It requires an electric motor for winding the kite in and a special kite tethered by a single tether that can be controlled to change its shape or pitch. It is unsuitable for generating power from water flow.

According to one aspect of the present invention there is provided a power generator comprising: a lifting body for suspension in a moving fluid; a control station; and at least two tethers for tethering the lifting body to the control station, wherein the control station is arranged to transform oscillating tension in the tethers produced by an oscillating movement of the lifting body into mechanical motion.

According to another aspect of the present invention there is provided a control station for a power generator using a lifting body in a fluid stream comprising: at least two tied points for the connection of at least two tethers for tethering the lifting body to the control station; and means for transforming oscillating tension in the tethers produced by an oscillating movement of the lifting body into mechanical motion.

According to one aspect of the present invention there is provided a method of extracting power from a fluid flow comprising the steps of: suspending a lifting body in the fluid flow using at least two tethers and transforming an oscillating tension in the tethers produced by an oscillating movement of the lifting body into mechanical motion.

Embodiments of the invention provide significant advantages. The lifting body is of very simple construction and does not need any special mechanisms to control its pitch or shape. All the mechanisms for controlling the pitch of the lifting body and generating power are located in the control station which can be located in an easily accessible position. The control station may be small and easily portable. It can be of a simple and robust construction. The power generator is particularly useful in the Third World.

For a better understanding of the present invention and to understand how the same may be brought into effect, reference will now be made by way of example only to the following drawings in which.

Figure 1:
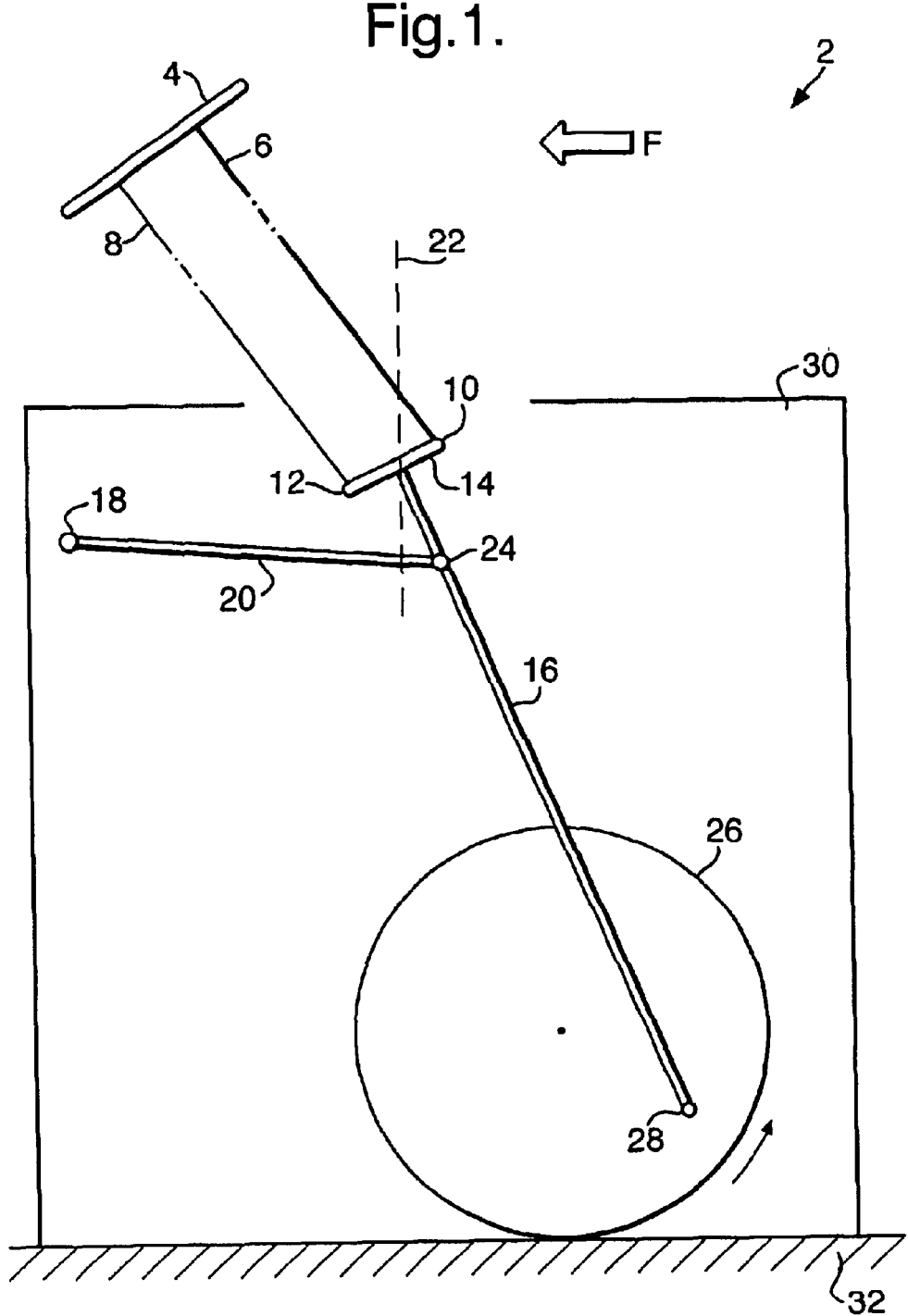
FIG. 1 illustrates a power generator according to one embodiment of the present invention.
Figure 2A:
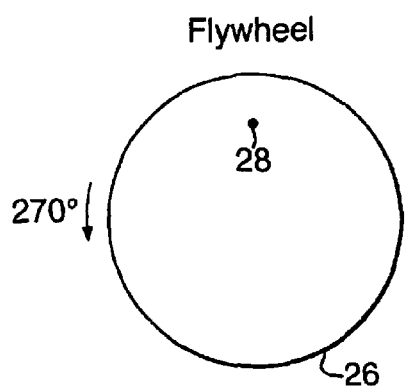
FIGS. 2a, 2b, 2c and 2d illustrate the cyclic rotation of the flywheel used for power generation.

FIG. 1 illustrates a power generator 2 comprising a lifting body 4, a control station 30 and first and second tethers 6 & 8 connecting the lifting body to the control station.

The lifting body is in a fluid flow F and the control station 30 is resting on an easily accessible surface 32, such as the ground, the deck of a boat or the top of a building. The control station 30 remains stationary on the surface 32 and the fluid flow F lifts and drags the lifting body 4. The first tether 6 and the second tether 8 are of fixed length and, in use, are under tension caused by the lift and drag of the lifting body 4. The points at which the first tether 6 and the second tether 8 connect to the lifting body 4 lie in a substantially straight line connecting the leading and trailing edges of the lifting body 4. The tethers 6, 8 are used to alter the angle of incidence (or pitch) of the lifting body 4 and hence the lift and drag.

The control station 2 controls pitch of the lifting body 4 and extracts power from the oscillatory modulation in the tension in the tethers 6, 8 caused by the variation in lift and drag. The control station 30 comprises a flywheel 26 mounted for rotation in a counter clockwise direction which stores the generated power. A 'T' shaped connecting rod 16 is connected at one end to the side of the flywheel at a distance from the flywheel's axis of rotation by a crank pin 28. The 'T' shaped connecting rod 16 has a connecting rod head 14 at its other end. The connecting rod head 14 has a first tie point 10 and a second tie point 12. In use, the first tether 6 is connected to the first tie point 10 and the second tether 8 is connected to the second tie point 12. The connecting rod head 14 is constrained to move along a line of constraint 22, by the constraining link 20 which is connected at one end to a fixed pivot point 18 and at the other end to the connecting rod via a pivoting connection 24. The line of constraint 22 will be curvilinear but will approximate to a rectilinear line for embodiments in which the constraining link 20 is long. For ease of illustration, the line of constraint in FIG. 1, has been shown as a rectilinear line. Other mechanisms can be used to control the rocking and translational movements which respectively provide control and power extraction.

The operation of the power generator 2 can be understood by referring to FIGS. 2a to 4d. FIGS. 2a, 2b, 2c and 2d illustrate the cyclic rotation of the flywheel 26. The position of the flywheel 26 within a rotation is denoted using the angle of rotation Beta which is 270 degrees, 0 degrees, 90 degrees and 180 degrees respectively in FIGS. 2a, 2b, 2c and 2d. FIGS. 3a, 3b, 3c and 3d illustrate the oscillation and reciprocation of the connecting rod head 14 attached at the crank pin 28 to the flywheel 26 by the connecting rod 16. The oscillation/rocking of the connecting rod head 14 provides control of the pull generated by the lifting body and the reciprocating/translational movement of the connecting rod 16 provides for power extraction. When Beta is 270 degrees, the connecting rod head 14, as shown in FIG. 3a, is at its maximum displacement away from the flywheel 26 and is tilted at an intermediate angle so that the first tie point 10 leads the second tie point 12. When Beta is 0/360 degrees, the connecting rod head 14, as shown in FIG. 3b, is at an intermediate displacement away from the flywheel 26 and is tilted at a minimum angle. In this particular embodiment, the minimum angle is zero so that the first tie point 10 is level with the second tie point 12. When Beta is 90 degrees, the connecting rod head 14, as shown in FIG. 3c, is at a minimum displacement away from the flywheel 26 and is tilted at an intermediate angle so that the first tie point 10 leads the second tie point 12. When Beta is 180 degrees, the connecting rod head 14, as shown in FIG. 3d, is at an intermediate displacement away from the flywheel 26 and is tilted at a maximum angle so that the first tie point 10 leads the second tie point 12.

Figure 3A:
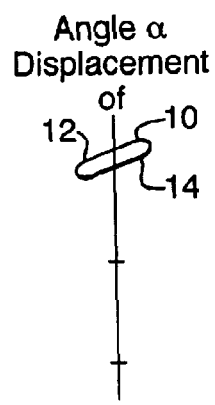
FIGS. 3a, 3b, 3c and 3d illustrate the oscillation and reciprocation of the connecting rod head attached to the flywheel.
Figure 3B:
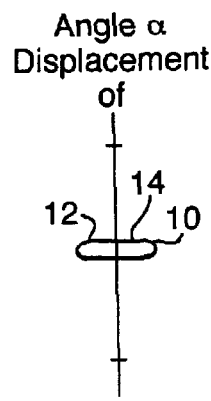
Figure 3C:
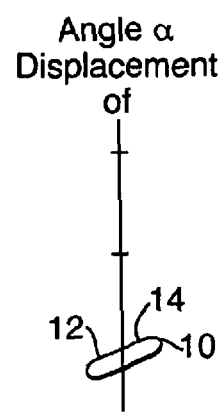

As the connecting rod head 14 moves towards the flywheel (return-stroke), it moves from the position illustrated in FIG. 3a through the position illustrated in FIG. 3b to the position illustrated in FIG. 3c. It moves from being at an intermediate angle to being flat and then returns to the intermediate angle. As the connecting rod head 14 moves away from the flywheel (out-stroke), it moves from the position illustrated in FIG. 3c through the position illustrated in FIG. 3d to the position illustrated in FIG. 3a. It moves from being at an intermediate angle to being at a maximum angle and then returns to the intermediate angle.

FIGS. 4a, 4b, 4c and 4d illustrate the oscillation of the lifting body 4 tethered to the oscillating connecting rod head 14. The lifting body and the connecting rod head 14 oscillate in phase.

Figure 4A:
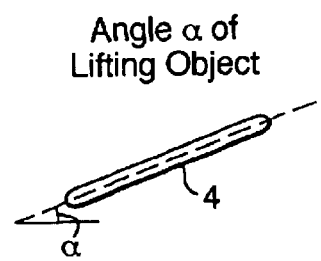
FIGS. 4a, 4b, 4c and 4d illustrate the oscillation of the lifting body tethered to the oscillating connecting rod head.
Figure 2B:
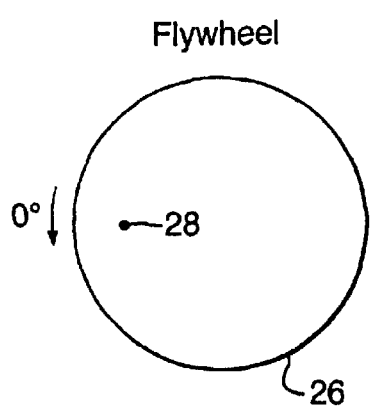

When Beta is 270 degrees, the pitch angle (alpha) of the lifting body 4, as shown in FIG. 4a, is at an intermediate value. The lift and drag created by the lifting body 4 in the fluid flow F is at an intermediate value, and the tension in the tethers 6,8 is at an intermediate value.

Figure 4B:
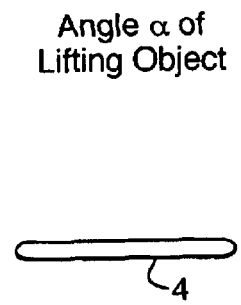
Figure 2C:
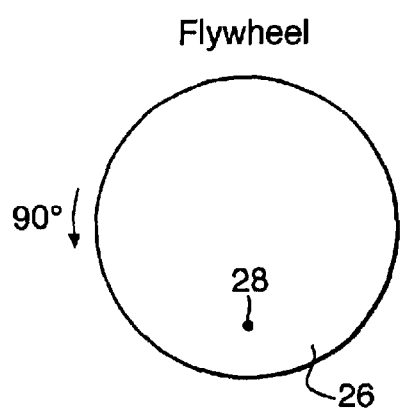

When Beta is 360 degrees, the pitch angle (alpha) of the lifting body 4, as shown in FIG. 4b, is at a minimum (zero) value. The lift and drag created by the lifting body 4 in the fluid flow F is at an minimum value, and the tension in the tethers 6, 8 is at a minimum value.

Figure 4C:
Figure 2D:
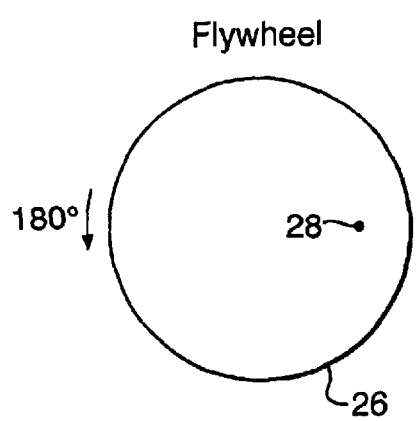
Figure 3D:
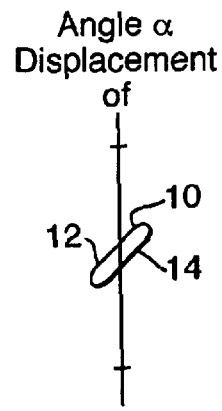

When Beta is 90 degrees, the pitch angle (alpha) of the lifting body 4, as shown in FIG. 4c, is at an intermediate value. The lift and drag created by the lifting body 4 in the fluid flow F is at an intermediate value, and the tension in the tethers 6,8 is at an intermediate value.

Figure 4D:
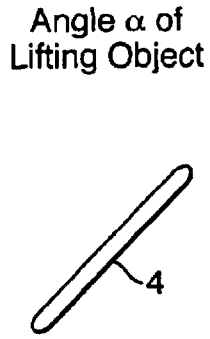

When Beta is 180 degrees, the pitch angle (alpha) of the lifting body 4, as shown in FIG. 4d, is at a maximum value. The lift and drag created by the lifting body 4 in the fluid flow F is at a maximum value, and the tension in the tethers 6, 8 is at a maximum value.

As the lifting body moves from the position illustrated in FIG. 4a through the position illustrated in FIG. 4b to the position illustrated in FIG. 4c, the tension in the tethers 6, 8 is modulated. It starts with an intermediate value then achieves a minimum value and finishes with an intermediate value.

As the lifting body 4 moves from the position illustrated in FIG. 4c through the position illustrated in FIG. 4c to the position illustrated in FIG. 4a, the tension in the tethers 6, 8 is modulated. It starts with an intermediate value, then achieves a maximum value and finishes with at an intermediate value.

Figure 5A:
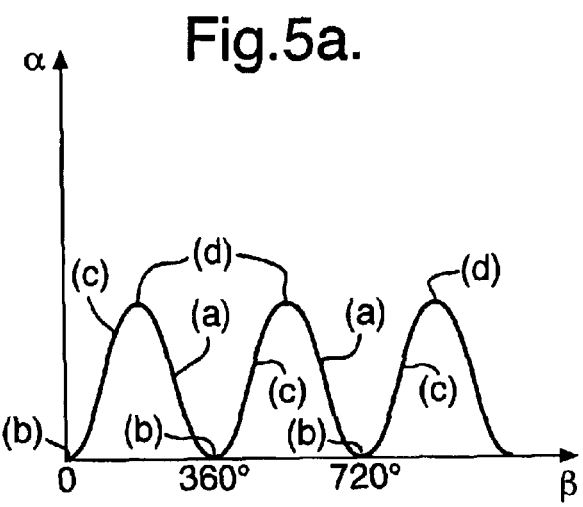
FIG. 5a illustrates the variation of the pitch angle (alpha) of the lifting body with the angle of rotation (Beta) of the flywheel.
Figure 5B:
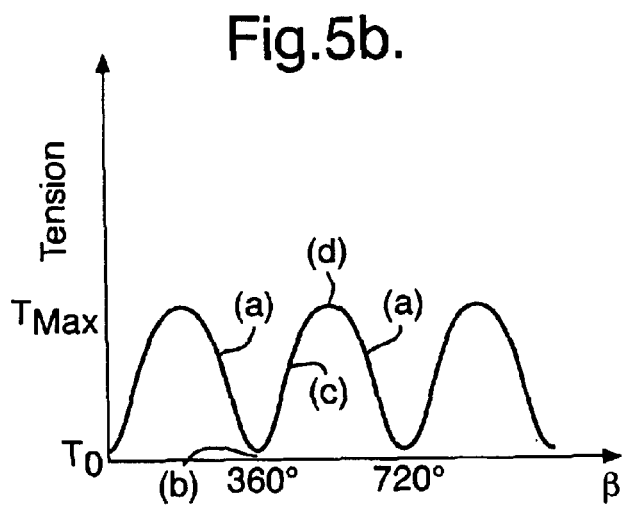
FIG. 5b illustrates the variation of the tension in the tethers of the lifting body with the angle of rotation (Beta) of the flywheel.
Figure 5C:
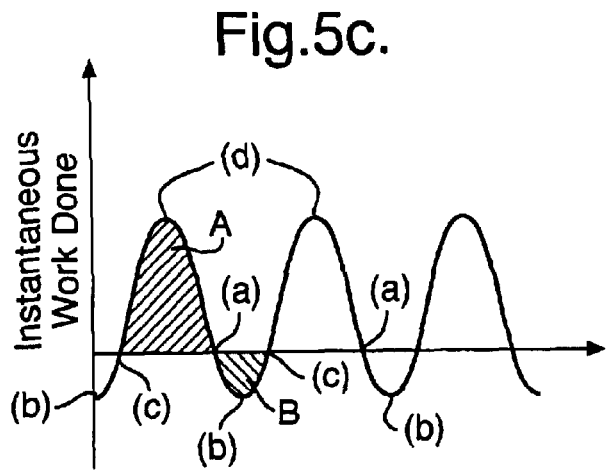
FIG. 5c illustrates the variation of the instantaneous work done with the angle of rotation (Beta) of the flywheel.

The oscillation of the pitch angle (alpha) of the lifting body 4 with the rotation angle (Beta) of the flywheel is illustrated in FIG. 5a and the oscillation of the tension in the tethers 6, 8 of the lifting body 4 with the rotation angle (Beta) of the flywheel 26 is illustrated in FIG. 5b. FIG. 5c illustrates the variation of the instantaneous work done with the rotation angle (Beta) of the flywheel.

The references (a) on FIGS. 5a, 5b and 5c illustrate the pitch angle (alpha), the tension in the tethers 6, 8 and the instantaneous work done when Beta is 270 degrees. The references (b) on FIGS. 5a, 5b and 5c illustrate the pitch angle (alpha), the tension in the tethers 6, 8 and the instantaneous work done when Beta is 0 degrees. The references (c) on FIGS. 5a, 5b and 5c illustrate the pitch angle (alpha), the tension in the tethers 6, 8 and the instantaneous work done when Beta is 90 degrees. The references (d) on FIGS. 5a, 5b and 5c illustrate the pitch angle (alpha), the tension in the tethers 6, 8 and the instantaneous work done when Beta is 180 degrees.

During the return-stroke (a), (b), (c) work is done by the flywheel. This work is provided by the angular momentum of the flywheel. During the out-stroke (c), (d), (e) work is done on the flywheel. The work done on the flywheel during the out-stroke (illustrated by area A in FIG. 5c) is greater than the work done by the flywheel during the return-stroke (illustrated by area B in FIG. 5c). There is therefore a net energy gain over each rotation of the flywheel, which can be used to drive an electricity generator, pump or other device.

The power generator 2 transforms energy in the fluid flow F into a rotation of the flywheel 26. The rotation of the flywheel 26 can be used to produce electricity, operate a pump or produce reciprocating motion.

In the foregoing, the first tether 6 and the second tether 8 are attached to a single lifting body 4. In other embodiments, multiple lifting bodies 4 can be stacked and each attached to the first tether 6 and the second tether In the foregoing the control station 30 has a single flywheel 26 and two tethers 6, 8. In other embodiments, the control station 2 may have multiple flywheels 26 connected together using cranks. Each of the multiple flywheels 26 would be attached to at least one lifting body 4 by two tethers 6, 8.

The fluid flow may be erratic, for example in gusting winds. To improve operability in such conditions, embodiments of the invention may have a deformable lifting body 4. Alternatively, a suspension is used. The suspension preferably has a spring or other elastic element between the connecting rod head 14 and each tether 6, 8. A damper may be attached in parallel to the spring.

In other embodiments, a slow response damper may be incorporated in the connecting rod above the pivoting connection 24 to accommodate changes in kite height with wind speed.

In other embodiments, the tethers are deformable to provide adaptation to different wind conditions and/or the 'T' shaped connecting rod 16 is deformable (with appropriate damping) to provide adaptation to different wind conditions.

In other embodiments, the constraining link 20 may be extendible. In FIG. 1, the constraining link has a first length so that the connecting rod head 14 is constrained to move along a line of constraint 22 to the left of the axis of the flywheel 26. This allows the power generator 2 to extract power from fluid flow in the direction right to left. According to the current embodiment, the constraining link may be extended to a second length, longer than the first length, so that the line of constraint 22 is positioned to the right of the axis of the flywheel 26 and the power generator 2 is able to extract power from a fluid flow from left to right. This is particularly useful for extracting power from tidal water movements.

In one application of embodiments of the invention, the fluid flow is wind and the lifting body 4 is an aircraft such as a kite or aerofoil. The control station 30 is preferably mounted on bearings so that it can rotate as the wind direction changes. The control station 30 is arranged with the axis of rotation of the flywheel 26 vertical and the tethers in a roughly vertical plane. The aircraft may comprise a lighter than air structure (helium filled) to prevent collapse and maintain altitude when there is no wind and help maintain lift during operation.

In another application of embodiments of the invention, the fluid flow is free streaming water which may be found in a river, an estuary, tidal flow or possibly in gross sea movements and the lifting body 4 is an otter board. When the water is provided by a river, the control station 30 is preferably placed on a river bank with the axis of rotation of the flywheel 26 vertical and the tethers in a roughly vertical plane. The otter board remains permanently under the water surface and is given lift by buoyancy in the otter board or by using separate floats.

In another application of embodiments of the invention, the fluid flow is free streaming water which may be found in a river, an estuary, tidal flow or possibly in gross sea movements and the lifting body 4 is an otter board. When the water is provided by a river, the control station 30 is preferably placed on a pontoon or moored raft in the river with the axis of rotation of the flywheel 26 horizontal and the tethers in a roughly horizontal plane. The otter board remains under the water surface for the out-stroke but floats on the surface of the water for at least part of the return-stroke to significantly reduce drag on this part of the cycle.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A power generator comprising:
   a lifting body for suspension in a moving fluid;
   a control station; and
   at least two tethers for tethering the lifting body to the control station, wherein the control station is arranged to transform oscillating tension in the tethers produced by an oscillating movement of the lifting body into mechanical motion.

2. A power generator as claimed in claim 1 wherein the tethers are of fixed length and fully extended in use.

3. A power generator as claimed in claim 1 wherein the control station is arranged to control the oscillatory motion of the lifting body using the at least two tethers.

4. A power generator as claimed in claim 1 wherein the control station is arranged to control the pitch of the lifting body using the at least two tethers.

5. A power generator as claimed in claim 1 wherein the control station comprises tied points for attaching the tethers and is arranged to oscillate the tied points of the tethers.

6. A power generator as claimed in claim 5 wherein the control station is additionally arranged to reciprocate the tied points of the tethers.

7. A power generator as claimed in claim 1 wherein the control station has a first tied point for connection to a first tether and a second tied point for connection to a second tether wherein the control station is arranged such that in use, as the lifting body moves in a first direction towards the control station, the first tied point moves faster than second tied point in the first direction and then the second tied point moves faster than first tied point in the first direction, and as the lifting body moves in a second direction away from the control station the first tied point moves faster than second tied point in the second direction and then the second tied point moves faster than first tied point in the second direction.

8. A power generator as claimed in claim 1 wherein the control station has a first tied point for connection to a first tether and a second tied point for connection to a second tether wherein the control station is arranged such that in use, as the lifting body moves in a first direction towards the control station, the first tied point moves further than second tied point in the first direction and then the second tied point moves further than first tied point in the first direction, and as the lifting body moves in a second direction away from the control station the first tied point moves further than second tied point in the second direction and then the second tied point moves further than first tied point in the second direction.

9. A power generator as claimed claim 1 wherein the control station is arranged such that, in use, it oscillates the pitch angle of the lifting body.

10. A power generator as claimed in claim 1 wherein the control station comprises a flywheel.

11. A power generator as claimed in claim 9 wherein the flywheel is arranged to pull the lifting body towards the control station.

12. A power generator as claimed in claim 1 wherein the control station comprises a crank.

13. A power generator as claimed in claim 12 wherein the tethers are extendible and/or the crank is deformable to provide adaptation to different wind conditions.

14. A power generator comprising:
    a lifting body for suspension in a moving fluid;
    a control station; and
    at least two tethers for tethering the lifting body to the control station, wherein the control station is arranged to provide rocking motion for control of the pull generated on the tethers by the lifting body and to provide a translational motion for extracting power from the change of pull in the tethers.

15. A power generator as claimed in claim 14 wherein the control station comprises a 'T' shaped connecting rod for providing the rocking motion and the translational motion.

16. A control station for a power generator using a lifting body in a fluid stream comprising:
    at least two tied points for the connection of at least two tethers for tethering the lifting body to the control station; and
    means for transforming oscillating tension in the tethers produced by an oscillating movement of the lifting body into mechanical motion.

17. A control station for a power generator using a lifting body in a fluid stream comprising:
    at least two tied points for the connection of at least two tethers for tethering the lifting body to the control station; and
    means for providing a rocking motion to control the pull generated on the tied points and for providing a translational motion to extract power from the change of pull on the tied points.

18. A method of extracting power from a fluid flow comprising the steps of:
    suspending a lifting body in the fluid flow using at least two tethers; and
    transforming an oscillating tension in the tethers produced by an oscillating movement of the lifting body into mechanical motion.

19. A method of extracting power from a fluid flow comprising the steps of:
    suspending a lifting body in the fluid flow using at least two tethers;
    providing a rocking motion to control the pull generated on the tethers by the lifting body; and
    providing a translational motion for extracting power from the change in pull in the tethers.

* * * * *